(No Model.) 5 Sheets—Sheet 1.
R. STANLEY.
TUNNELING MACHINE.

No. 414,893. Patented Nov. 12, 1889.

Witnesses
Will T. Norton
Alvin Belt

Inventor
Reginald Stanley
by John J. Halsted & Son
his Attys.

(No Model.)  5 Sheets—Sheet 2.

R. STANLEY.
TUNNELING MACHINE.

No. 414,893.  Patented Nov. 12, 1889.

Witnesses.
Will T. Norton
Alvin Belt

Inventor
Reginald Stanley
by John J. Halsted & Son
his Attys.

(No Model.) 5 Sheets—Sheet 3.
R. STANLEY.
TUNNELING MACHINE.
No. 414,893. Patented Nov. 12, 1889.
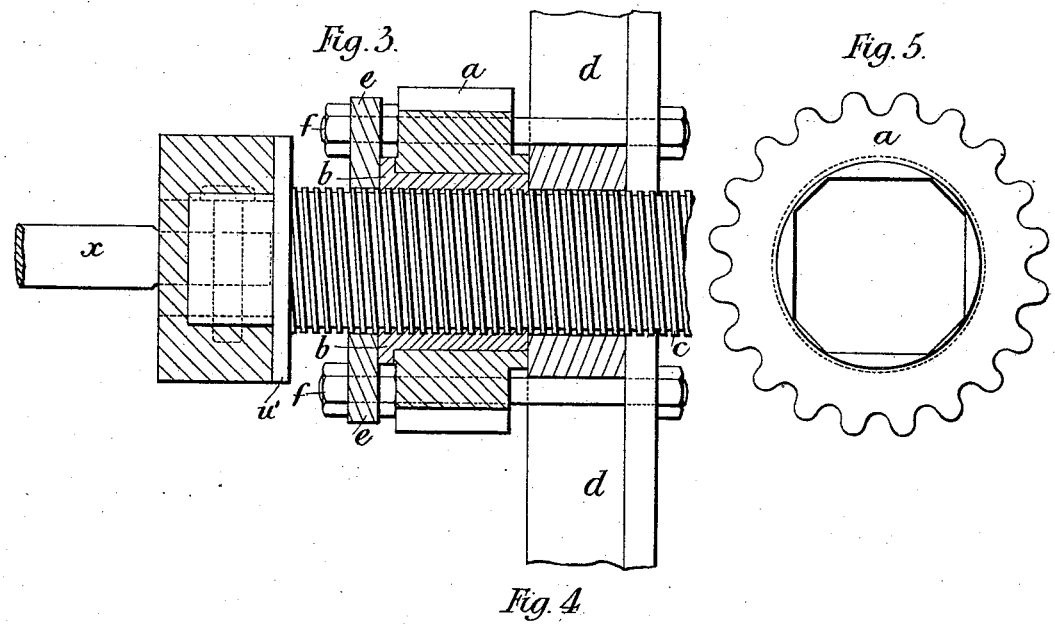
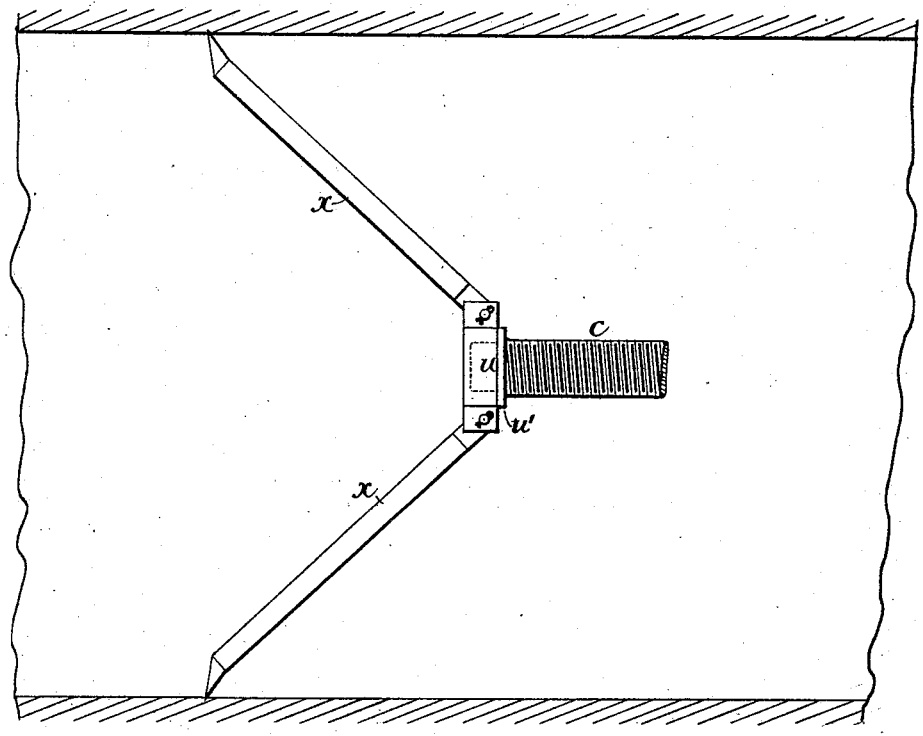
Witnesses.
Will T. Norton
Shin Belt
Inventor.
Reginald Stanley
by John J. Halsted & Son
his Attys (No Model.) 5 Sheets—Sheet 4.
R. STANLEY.
TUNNELING MACHINE.
No. 414,893. Patented Nov. 12, 1889.
Fig. 6.
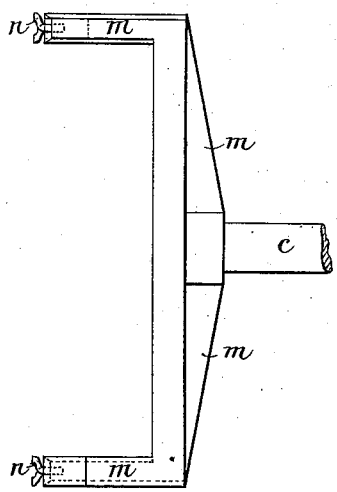
Fig. 11.
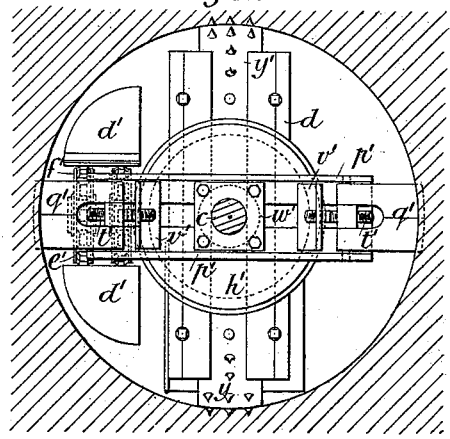
Fig. 12.
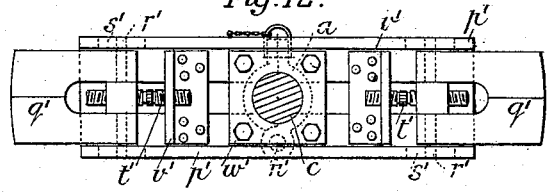
Fig. 7.
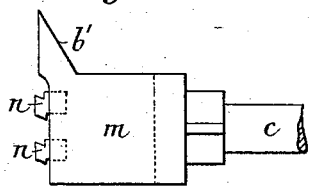
Fig. 13.
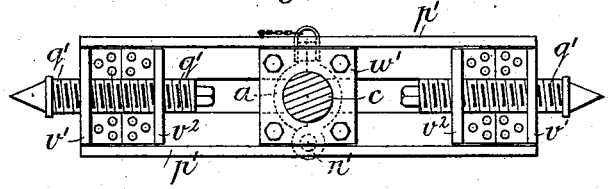
Fig. 14.
Fig. 8.
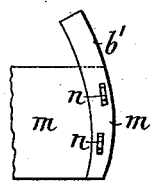
Fig. 15.
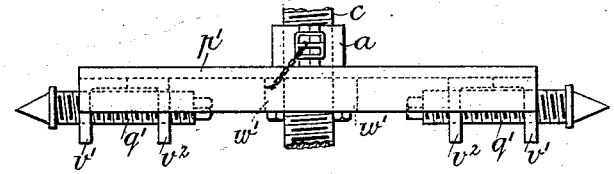
Witnesses:
Inventor:
Reginald Stanley
by John L. Halsted & Son
his Attys.

(No Model.) 5 Sheets—Sheet 5.

R. STANLEY.
TUNNELING MACHINE.

No. 414,893. Patented Nov. 12, 1889.

Witnesses.

Inventor.
Reginald Stanley
by John J. Halsted & Son
his Attys.

UNITED STATES PATENT OFFICE.

REGINALD STANLEY, OF NUNEATON, COUNTY OF WARWICK, ENGLAND.

TUNNELING-MACHINE.

SPECIFICATION forming part of Letters Patent No. 414,893, dated November 12, 1889.

Application filed November 14, 1888. Serial No. 290,774. (No model.)

*To all whom it may concern:*

Be it known that I, REGINALD STANLEY, a subject of the Queen of Great Britain, residing at Nuneaton, in the county of Warwick, England, have invented new and useful Improvements in Tunneling-Machines, of which the following is a specification.

My invention relates to boring or tunneling machinery of the class described in the specification of Letters Patent granted to me and dated July 13, A. D. 1886, No. 345,551.

In order to enable my invention to be fully understood, I will describe how it can be carried into practice by reference to the accompanying drawings, in which—

Figure 1:
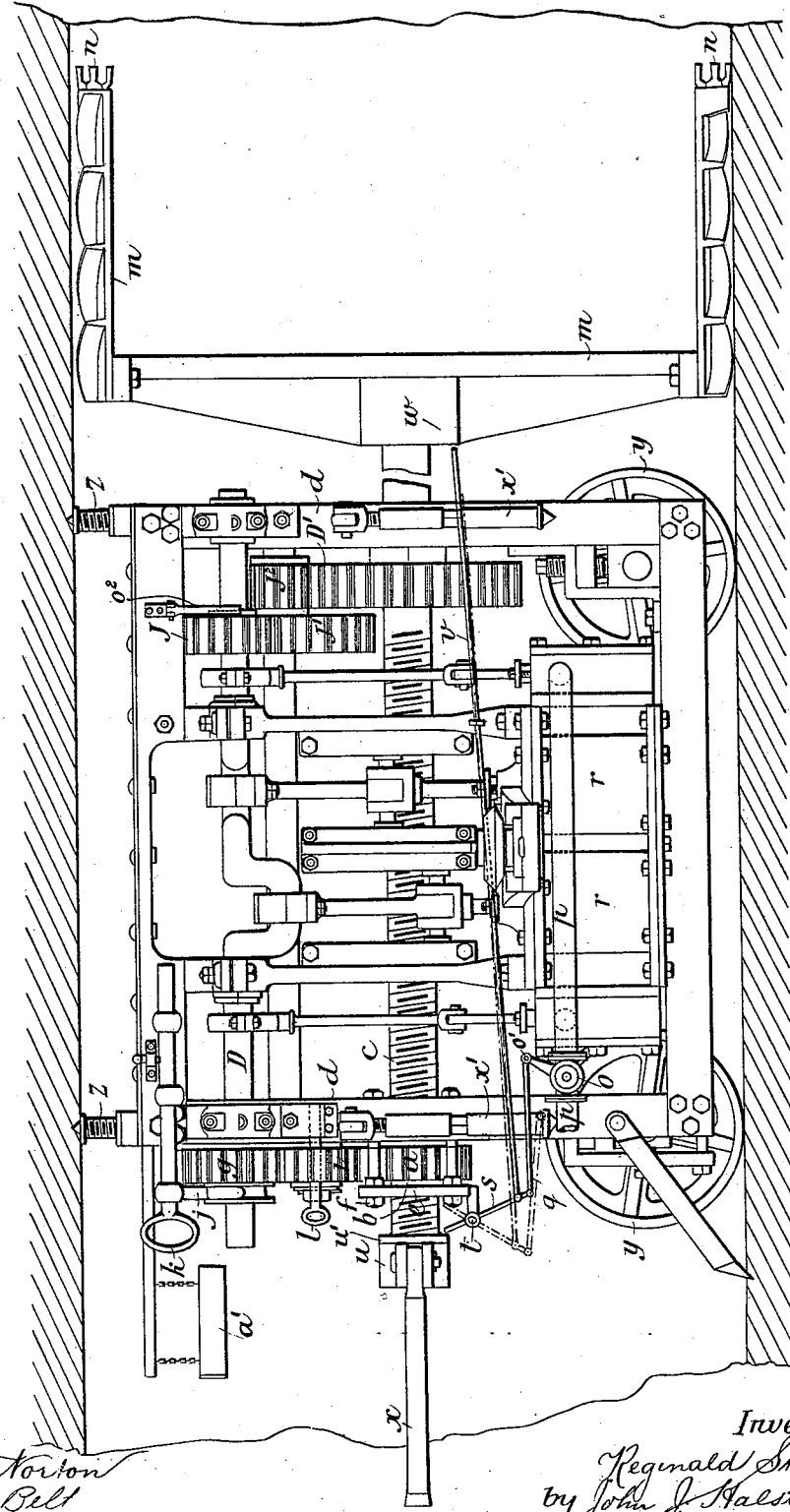
Figure 2:
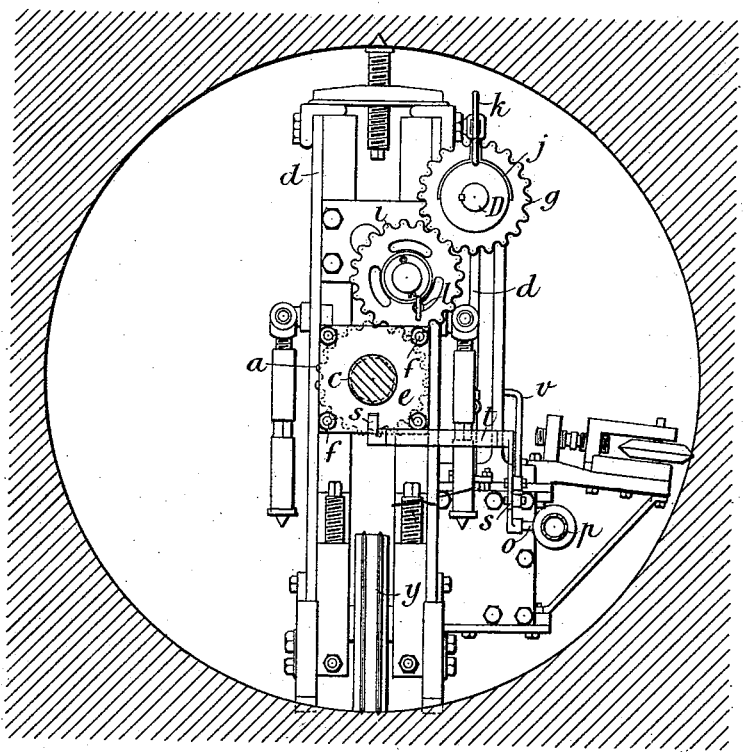
Figure 9:
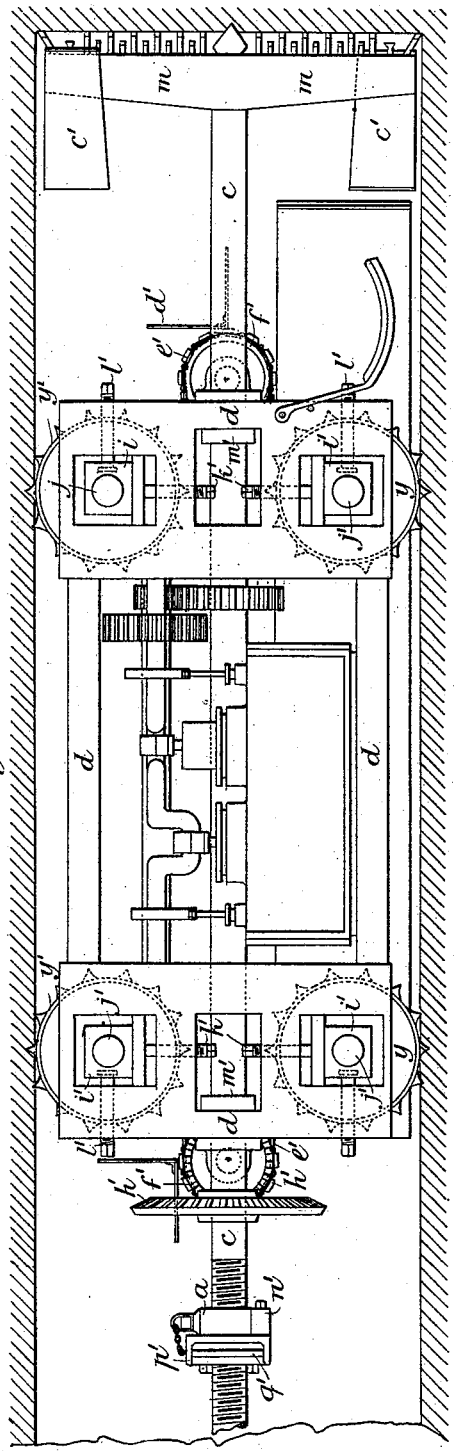
Figure 10:
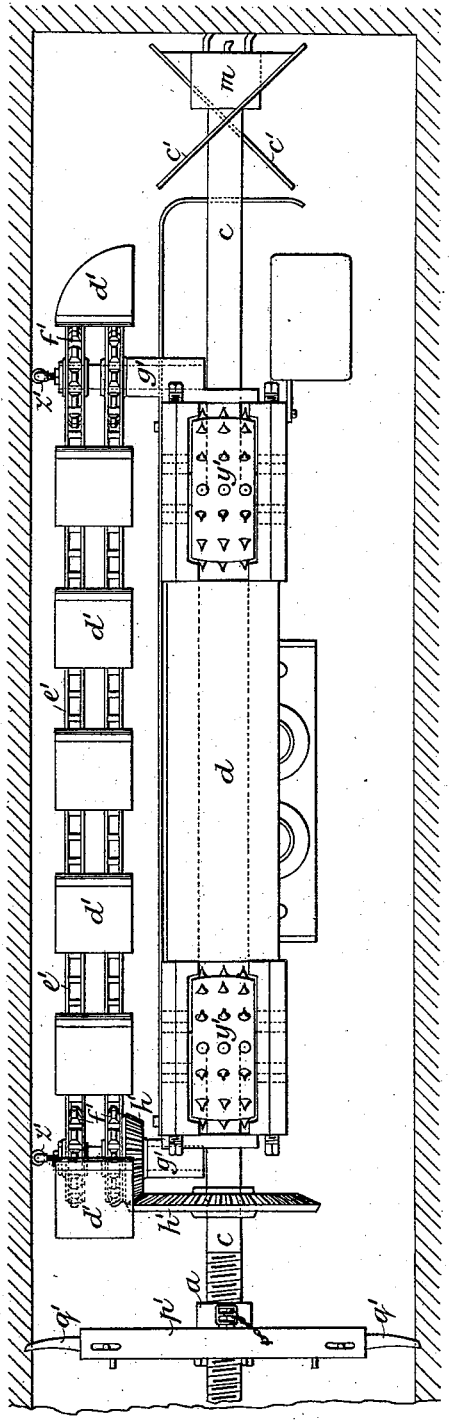

Figure 1 is a side elevation of a boring or tunneling machine which is fixed in the tunnel during the cutting operation and constructed according to my present improvements. Fig. 2 is a rear end elevation of the same, partly in section. Figs. 3, 4, and 5 are enlarged views of parts of the machine. Fig. 6 is a side elevation of a modified form of horizontal cutting-arms. Fig. 7 is a plan of the said arms, and Fig. 8 is a front view of one of the ends of the same. Fig. 9 is a side elevation of a boring or tunneling machine, which is propelled during the cutting operation, showing the modifications necessary to adapt my improvements to such machine. Fig. 10 is a plan, and Fig. 11 is an end elevation, of the same. Fig. 12 is a rear elevation, and Fig. 13 is a side elevation, of the separate frame fitted with adjustable hinged cows. Figs. 14 and 15 are views similar to Figs. 12 and 13, but showing the said frame fitted with screw-threaded pins.

Similar letters in all the figures indicate similar or corresponding parts.

I will first describe my improvements by reference to Figs. 1 to 5.

$a$, Figs. 1 and 3, is the cog-wheel, (shown also detached in face view at Fig. 5,) fitted with the screw-threaded bush $b$, working upon or over the thread of the central or screw-threaded shaft $c$. This wheel, hereinafter for the sake of distinction called the "propelling-wheel," is held in position on the frame $d$ of the machine by means of a plate $e$ and bolts and nuts $f f$.

$g$ is the cog-wheel on the crank-shaft D of the machine, to which wheel, through the intermediate wheel $i$, the propelling-wheel $a$ is geared.

$j$ is a shifting-fork operated by a handle $k$ for throwing the cog-wheel $g$ in and out of gear.

$l$ is a pin inserted through a hole in the wheel $i$ and in the frame $d$ of the machine when required to prevent the propelling-wheel $a$ from revolving while the cutting-gear and the screw-threaded shaft $c$, with the arms $m$ and cutters $n$ attached thereto, are in motion; or any other suitable means can be employed for this purpose. The screw-threaded shaft $c$, with its arms and cutters, is driven from the crank-shaft D of the engine by means of a pinion J, mounted on the said shaft, a wheel J' and a pinion $J^2$ on another shaft, and a spur-wheel D' on the screw-threaded shaft $c$.

$o$ is the cock whereby the compressed air or other motive fluid is admitted to or shut off from the cylinders $r\ r$ of the engine, the said cock being situated on the supply-pipe $p$.

The arrangement I employ for shutting off the supply of the motive fluid at a given point of travel of the screw-threaded shaft $c$ consists of a rod $q$, jointed to a crank or projection $o'$ on the handle of the plug of the cock $o$ and to a lever $s$, moving on a center $t$, fixed to the plate $e$, as shown in Fig. 1, or to any suitable part of the frame $d$ of the machine. The free end of this lever is acted upon by a collar $u'$ on the threaded shaft $c$ when the rear end of the shaft has worked up to or near to the back of the frame $d$, and is moved into the position shown in dotted lines, thereby shutting the cock $o$ and stopping the engine. A similar effect is produced when the frame $d$, which is being advanced, reaches or nearly reaches the back of the arms $m$ by means of a rod $v$, jointed to the lever $s$ and having its free end in a position to be acted upon by the back of the arms $m$ at the point $w$.

When it is required to work the engine, the collar $u'$ or the arms $m$ having moved the rod $s$ so as to shut the cock $o$, the rod $q$ is temporarily uncoupled from the projection $o'$ until the frame or the arms have sufficiently advanced to allow of its being coupled up again without shutting the cock $o$.

$x\ x$ are arms forming a horizontal cow or spray, (shown in Fig. 1 and in detached plan view at Fig. 4,) jointed to the cap $u$ at the back of the collar $u'$ on the rear end of the shaft $c$ and intended to catch into the two sides of the heading, so as to effectually prevent the shaft $c$ from being forced back while the frame $d$ of the machine is being moved on its carrying-wheels $y$ $y$ into position ready to be fixed to perform a fresh cutting. The arms $x$ $x$, in conjunction with the arms $m$, which are set across the heading, serve to assist in steadying the frame and in keeping it upright while it is being advanced between the cuts. When the frame is fixed and the cutting is commenced, the cap $u$ and arms $x$ $x$ are removed and placed on one side. It will be obvious, however, that other means could be employed for the same purpose as the arms $x$ $x$ are used—such, for example, as a prop of timber set in the floor and roof of the heading at the back of the shaft $c$.

The pinion J on the crank-shaft D of the engine works into the cutting-gearing, consisting of the wheels $J'$, $J^2$, and $D'$, and is prevented from sliding in and out of gear while the engine is in motion by means of a hinged bolt $o^2$.

The machine is worked as follows: When it is required to advance the frame and engine parts of the machine while the threaded shaft $c$ remains stationary in the heading, the pinion J is put out of gear with the wheel $J'$ and the cog-wheel $g$ is put in gear with the intermediate wheel $i$, from which the fixing-pin $l$ must be removed. The ends of the cow or spray $x$ $x$ are secured in the sides of the heading, the frame is unfixed from the sides and top of the heading by unscrewing the screw-pins $x'$ $x'$ and Z Z, respectively, and the engine is set in motion. The propelling-wheel $a$ will be thereby caused to revolve on the threaded shaft $c$ and will advance along the shaft, moving with it the frame and engine parts of the machine toward the back of the cutter-arms $m$ as far as required, the shaft and cutter-arms being meanwhile prevented from moving backward in the heading by the cow or spray $x$ $x$. The frame can then be again fixed in the heading ready for a fresh cutting operation. In order to cause the threaded shaft $c$ and arms $m$ to advance or retire without rotating, the frame $d$ is fixed in the heading by means of the screw-pins $x'$ $x'$ and Z Z, the cow or spray $x$ $x$ must be removed, and the engine set in action. The engine will rotate the propelling-wheel $a$, and this will cause the shaft and arms to move forward or rearward, according to the direction in which the wheel $a$ is revolved. When the threaded shaft $c$ and cutter-arms $m$ are required to be simultaneously rotated and advanced in order to perform a cutting operation, the frame $d$ must be fixed in the heading, as above described, and the wheel $g$ disengaged (by operating the fork $j$) from the wheel $i$, which must be locked to the frame $d$ by inserting the pin $l$ therein, so as to fix the propelling-wheel $a$. The pinion J and wheel $J'$ must be placed in gear and the engine set in action, when the shaft $c$, with the arms $m$ and cutters $n$, will revolve and will, by working through the threaded bush $b$ of the propelling-wheel $a$, be caused to advance. When it is required to regulate the speed of advance of the shaft $c$ when the cutters meet with stones or other very hard material, or upon other occasions, the pin $l$ is withdrawn, when the propelling-wheel $a$ can be so regulated by means of a brake or otherwise as to give way to the pressure and prevent the shaft advancing in the frame as fast as it would otherwise do. The engine can be made so that it can be reversed and worked in either direction, or it can be constructed to work in one direction only. In the former case it will be obvious that, if required, the frame can be caused to move backward in the heading by simply reversing the engine and propping or supporting the radial arms $m$ from the face of the heading, or securing each end of the said arms by means of wedges to the sides of the heading, so that when the wheel $a$ is rotated the frame $d$ will move along the threaded shaft $c$ toward the back end thereof.

In the drawings I have shown the machine provided with horizontal arms and cutters adapted to cut an annular groove in the heading; but it will be understood that my invention is equally applicable for use with radial arms having cutters arranged on their face and adapted to cut away the whole face of the heading.

To allow the direction of cutting to be regulated, I find it advantageous to attach to the machine a small dialing-instrument $a'$, consisting of a tube with two wires stretched perpendicularly to each other over the ends thereof. This instrument is arranged parallel with the axis of the shaft $c$, and by sighting through it at a light held at some distance off in the rear of the working the direction of the cut can be accurately seen, and then, if required, be adjusted, or the following mode of working is adopted: After the frame and engine parts are advanced, and before fixing and making the next cut, I measure with a gage from the back of the screw-threaded shaft to the sides of the heading, so as to get it exactly in the center, in which case, when the frame is fixed, it will cut straight forward in the direction it is set; or if it is desired to change the direction of the cut to the right or left the frame is fixed accordingly by measuring from the shaft to the side in like manner.

By the use of the propelling-wheel $a$ the frame and engine parts of the machine can be moved forward and backward in a more sure and accurate manner than has hitherto been the case. A saving in wear and tear is effected, and the rate of advance of the cutters relatively to their speed of rotation can be regulated. The withdrawal and advance of the threaded shaft $c$, with the arms and cutters, for the purpose of changing the cutters or for other purposes while the frame and engine parts of the machine are stationary are effected with greater speed and efficiency than formerly, and a saving in time and labor will obviously result in working the machine, especially on level or rising headings.

In this machine I have shown the horizontal arms $m\ m$ provided with sweepers or scrapers similar to those described in my said former specification. I sometimes, however, find it advantageous to use the form of arms shown in Figs. 6, 7, and 8, in which the sweepers or scrapers are dispensed with and a tapered projection $b'$ on the front of each of the horizontal arms $m$ is used for the purpose of clearing the cuttings from the annular groove, so as to allow the arms and cutters to do their work. The thickness of the arms $m$ is greater at the front, from which the nose or tapered projection $b'$ projects, than at the back, as will be seen by referring to Fig. 8, so that in the process of cutting any cuttings that may pass the front of the arms will not wedge or clog their action. The principle of the tapered projection is the same as the scrapers and sweeps of my said former patent; but it has the advantage that a narrower groove can be made, which in very hard material is sometimes found an advantage. It is evident that the tapered projection can be used in combination with the said scrapers or sweepers.

Referring to the modified form of my invention illustrated in Figs. 9 to 13, the cutters are shown arranged upon the face of the radial arms carried by the screw-threaded shaft $c$, so as to cut away the entire face of the tunnel. The cutters are of two different lengths, as clearly shown in Fig. 9, the longer ones cutting into the face of the tunnel and the shorter ones serving to remove any ribs that may remain on the said face between the cuts made by the longer cutters. The arms $m$ are provided with sweepers $c'$, which sweep the cuttings and fine material as they fall from the face of the tunnel back to the side thereof within range of scrapers $d'$, attached to an endless belt $e'$, by which the cuttings are passed from the front to the rear of the machine, whence they are removed by any suitable means. The belt $e'$ is carried on and worked by wheels $f'\ f'$, which are revolved on the projecting shafts $g'\ g'$ by means of bevel-wheels $h'\ h'$, driven from the screw-threaded shaft $c$, while the face of the tunnel is being cut away.

The carrying-wheels $y\ y$ are spiked or roughened, as shown, and the machine carries similarly spiked or roughened wheels $y'\ y'$ at its upper part. These wheels $y$ and $y'$ are intended to bite into the floor and roof of the tunnel, and the bearings $i'\ i'$ of their axles $j'\ j'$ are adjustable to alter the height and direction of the wheels by means of set-screws $k'$ and $l'$. By this means the direction of the cutting can be altered and regulated.

$z'\ z'$ are rollers carried on the ends of the shafts $g'\ g'$, and serve to steady and support the machine on that side by bearing and running against the side of the tunnel.

The screw-threaded shaft $c$ is carried in bearings at the front and back of the frame $d$ of the machine, and is prevented from sliding longitudinally by means of collars $m'\ m'$ fixed thereon. The screw-thread of the shaft $c$ is formed on a rearwardly-extending portion, and the whole machine is advanced while the cutting is in progress by means of a divided nut $a''$, in which the screw-threaded portion of the shaft $c$ works while the cutters are operating on the face of the tunnel. The two parts of the nut $a''$ are hinged at $n'$ to a frame $p'$, formed separate from the machine and adapted to be fixed in the tunnel by means of a pair of cows $q'\ q'$, mounted on pivots $r'\ r'$, movable in slots $s'\ s'$ in the frame $p'$. The distance at which the cows $q'$ project from the ends of the frame is adjusted by operating set-screws $t'\ t'$, working in the pivots $r'$ and in brackets $v'\ v'$ in the frame $p'$, and when the frame is fixed in position the cows bear against the ends of the angle-iron of which the frame is formed. The frame $p'$ is also provided with a smooth bearing $w'$ to allow the frame to be slid along the shaft when the nut $a''$ is opened, as hereinafter described. By this means when the frame $p'$ has been placed in proper position in the tunnel and the cutter-shaft $c$ is revolved to cut away the face of the tunnel the screw-threaded extension of the shaft, working in the split nut $a''$, will cause the whole machine to move forward as fast as the face of the tunnel is cut away until the rear end of the shaft $c$ has worked up to the nut. By then stopping the engine and simply opening the nut $a''$ and unfixing the frame $p$ the latter can be slid along the shaft into position ready to be again fixed to continue the cutting.

The propelling-frame shown in Figs. 14 and 15 is the same as that hereinbefore described with reference to Figs. 9 to 13, with the exception that, instead of hinged cows, strong screw-pins $q'\ q'$ are used, which work through the two brackets or angle-plates $v'\ v^2$, which also serve to strengthen and hold the frame $p'$ together.

By the use of this improved tunneling-machine and the manner of advancing it for cutting and of bringing back the cuttings, much time and labor are saved and a speedy, sure, and steady advance is made. The time required for setting the propelling-bracket for another cutting is short, and this is the only cause for delay in the cutting operations except the always-necessary time for changing cutters, attaching pipes, and doing necessary repairs.

Having now particularly described the nature of my said invention, I declare that what I claim is—

In a tunneling-machine, the combination of a frame carried on central tandem wheels working on the floor of the tunnel, a central threaded shaft carried by such frame, a driving-wheel working on such shaft, radial arms and horizontal arms at one end of said shaft and provided with cutters and scrapers adapted for forming an annular groove around the face of the tunnel, the said frame carrying engines and gearing for actuating the above-named devices, and a spur-wheel with threaded boss or bush working on the threaded portion of the said shaft, bearing against the frame, driven by gearing from the engine or engines, and serving the purpose either of actuating the central shaft and its arms and cutters while the said frame, its engines, and gearing are held stationary in the tunnel or of actuating the frame and its engines and gearing while the shaft and arms are held stationary, substantially as described.

R. STANLEY.

Witnesses:
G. F. REDFERN,
JOHN E. BONSFIELD.